(12) United States Patent
Fang et al.

(10) Patent No.: US 6,935,874 B1
(45) Date of Patent: Aug. 30, 2005

(54) COOKING ASSEMBLY WITH A SAFETY DEVICE

(75) Inventors: Chih-Cheng Fang, Tainan (TW); Kuang-Yi Hsu, Kaohsiung (TW)

(73) Assignee: Tsann Kuen Enterprise Co., Ltd., Taipei (TW)

( * ) Notice: Subject to any disclaimer, the term of this patent is extended or adjusted under 35 U.S.C. 154(b) by 69 days.

(21) Appl. No.: 10/800,335

(22) Filed: Mar. 12, 2004

(51) Int. Cl.$^7$ ............................................. H01R 13/44
(52) U.S. Cl. ................... 439/137; 439/299; 439/924.2
(58) Field of Search ..................... 219/459.1, 458.1; 439/135, 304, 137, 138, 145, 299, 924.2

(56) References Cited

U.S. PATENT DOCUMENTS

| | | | | |
|---|---|---|---|---|
| 2,579,538 A | * | 12/1951 | Bierce | ......................... 439/137 |
| 3,737,623 A | * | 6/1973 | Vallone | ....................... 219/441 |
| 4,867,693 A | * | 9/1989 | Gizienski et al. | ........... 439/137 |
| 4,867,694 A | * | 9/1989 | Short | ........................ 439/137 |
| 6,252,204 B1 | * | 6/2001 | Po-Hei | .................... 219/450.1 |
| 6,472,644 B1 | * | 10/2002 | Wu | ............................. 439/135 |
| 6,537,089 B1 | * | 3/2003 | Montague | ................... 439/145 |
| 6,759,634 B2 | * | 7/2004 | Wang | ......................... 219/433 |

* cited by examiner

*Primary Examiner*—Briggitte R. Hammond
(74) *Attorney, Agent, or Firm*—Ladas & Parry LLP (57) ABSTRACT

A cooking assembly includes a tray unit mounted detachably on a base member, and a plug. The tray unit includes a cooking tray, and a socket casing fixed to the cooking tray. The plug is insertable into the socket casing. A spring-biased latch is disposed movably in the socket casing, and is pushed by the plug to move from a first position to a second position upon insertion of the latter into the socket casing. The latch engages the base member when the latch is disposed at the second position, and disengages the base member when the latch is disposed at the first position.

16 Claims, 9 Drawing Sheets

COOKING ASSEMBLY WITH A SAFETY DEVICE

BACKGROUND OF THE INVENTION

1. Field of the Invention

The invention relates to a cooking assembly, more particularly to a cooking assembly with a safety device for preventing insertion of a plug into a socket of a tray unit when the tray unit is disconnected from a base member and for preventing undesired removal of the tray unit from a base member when the plug is inserted into the socket of the tray unit.

2. Description of the Related Art

Figure 1:
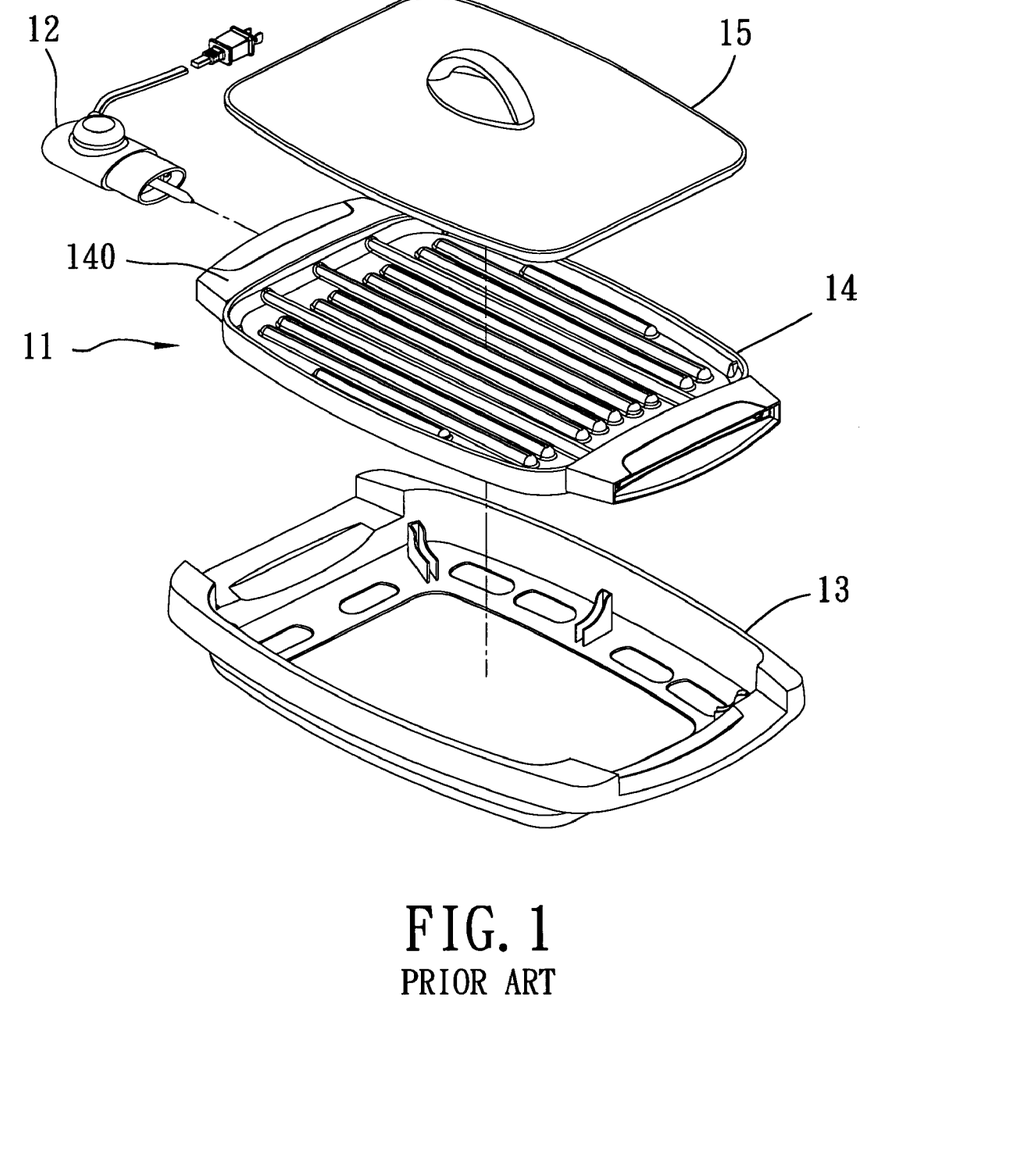
FIG. 1 is an exploded perspective view of a conventional cooking assembly.

Referring to FIG. 1, a conventional cooking assembly 11 is shown to include a base member 13, a tray unit 14 mounted detachably on the base member 13 and formed with a socket 140, a plug 12 adapted to be inserted releasably into the socket 140 for establishing electrical connection between the tray unit 14 and a power source (not shown), and a top cover 15 for covering the tray unit 14.

One disadvantage resulting from the use of the aforesaid conventional cooking assembly resides in that when the tray unit 14 is removed from the base member 13 for cleaning purposes, the user may accidentally get an electric shock during cleaning process if the plug 12 is still in the socket 140.

SUMMARY OF THE INVENTION

The object of this invention is to provide a cooking assembly with a safety device so as to eliminate the aforesaid disadvantage of the conventional cooking assembly.

Accordingly, a cooking assembly of the present invention includes: a cooking device a base member; a tray unit mounted detachably on the base member, and including a cooking tray and a socket that is fixed securely to the cooking tray and that has a socket casing formed with a plug hole that defines a plug path therein; a plug insertable releasably into the plug hole in the socket casing along the plug path for establishing electrical connection with the tray unit; and a safety device including at least one spring-biased latch mounted movably in the socket casing, having first and second engaging ends, and movable in a transverse direction relative to the plug path between a first position, in which the first engaging end of the latch is disposed at a position within the plug path, thereby permitting contact between the first engaging end of the latch and the plug when the plug is inserted into the plug hole in the socket casing, and in which the second engaging end of the latch is disengaged from the base member, and a second position, in which the first engaging end of the latch is disposed at a position outside the plug path, and in which the second engaging end of the latch engages the base member.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Referring to FIGS. 2 to 5, the preferred embodiment of a cooking assembly according to the present invention is shown to include a base member 2, a tray unit 3, a plug 4, and a safety device 5.

Figure 2:
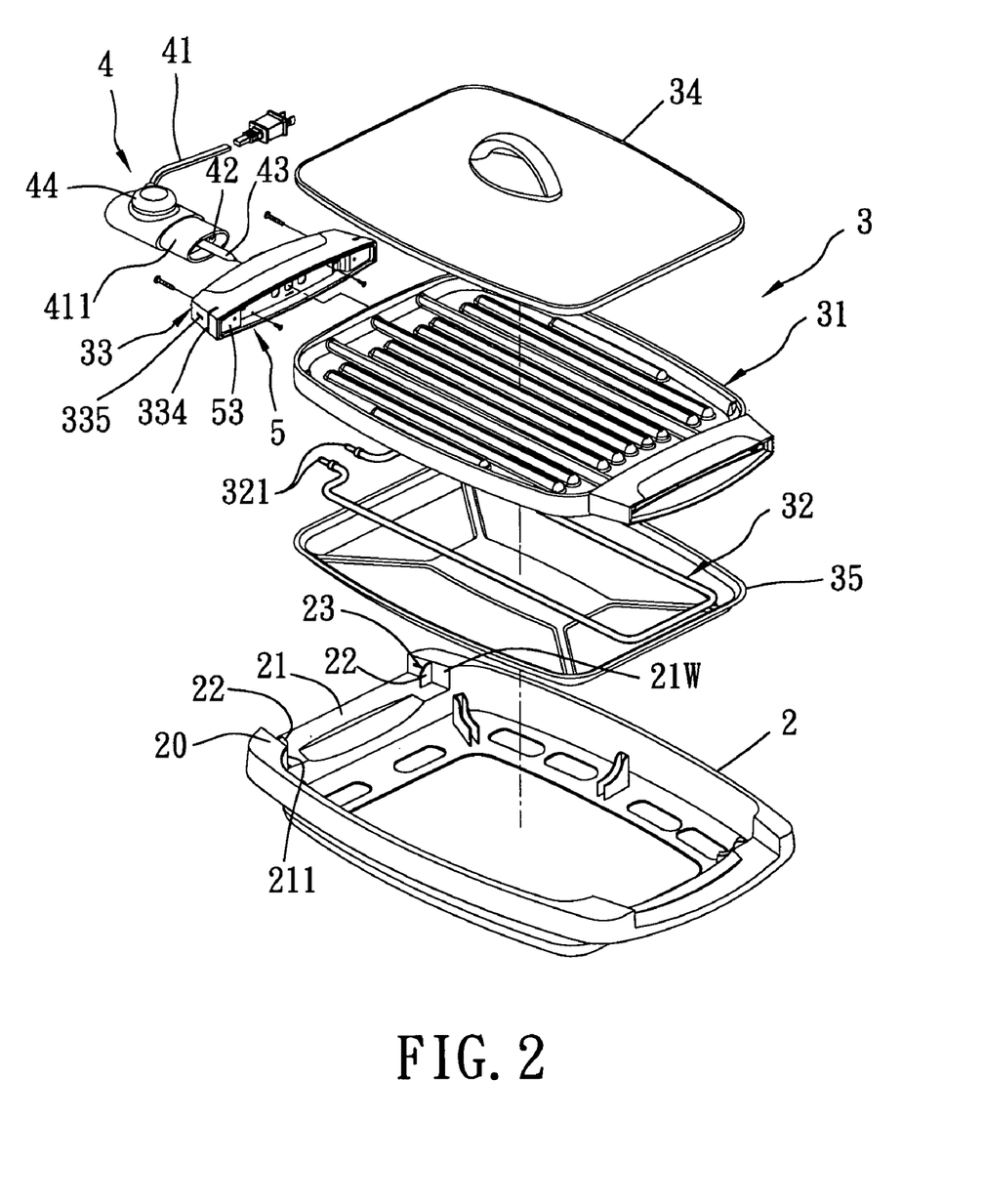
FIG. 2 is an exploded perspective view of the preferred embodiment of a cooking assembly according to the present invention.
Figure 3:
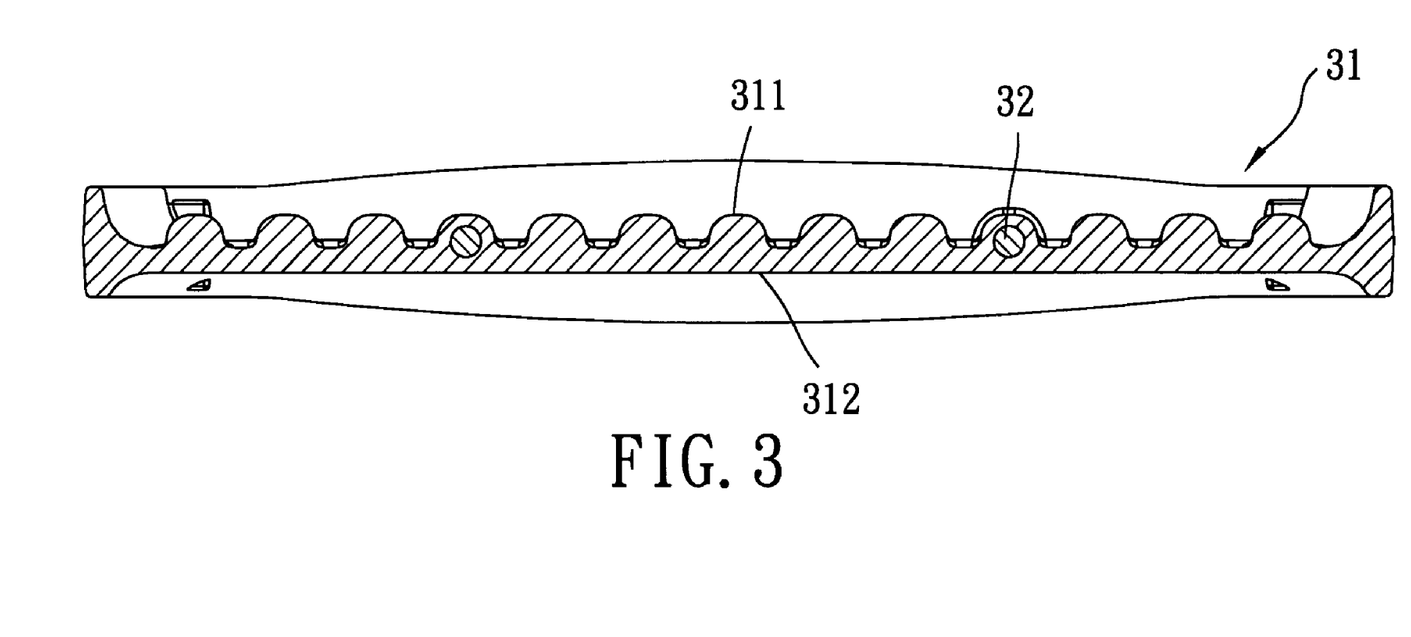
FIG. 3 is an enlarged sectional view of a tray unit of the preferred embodiment.
Figure 4:
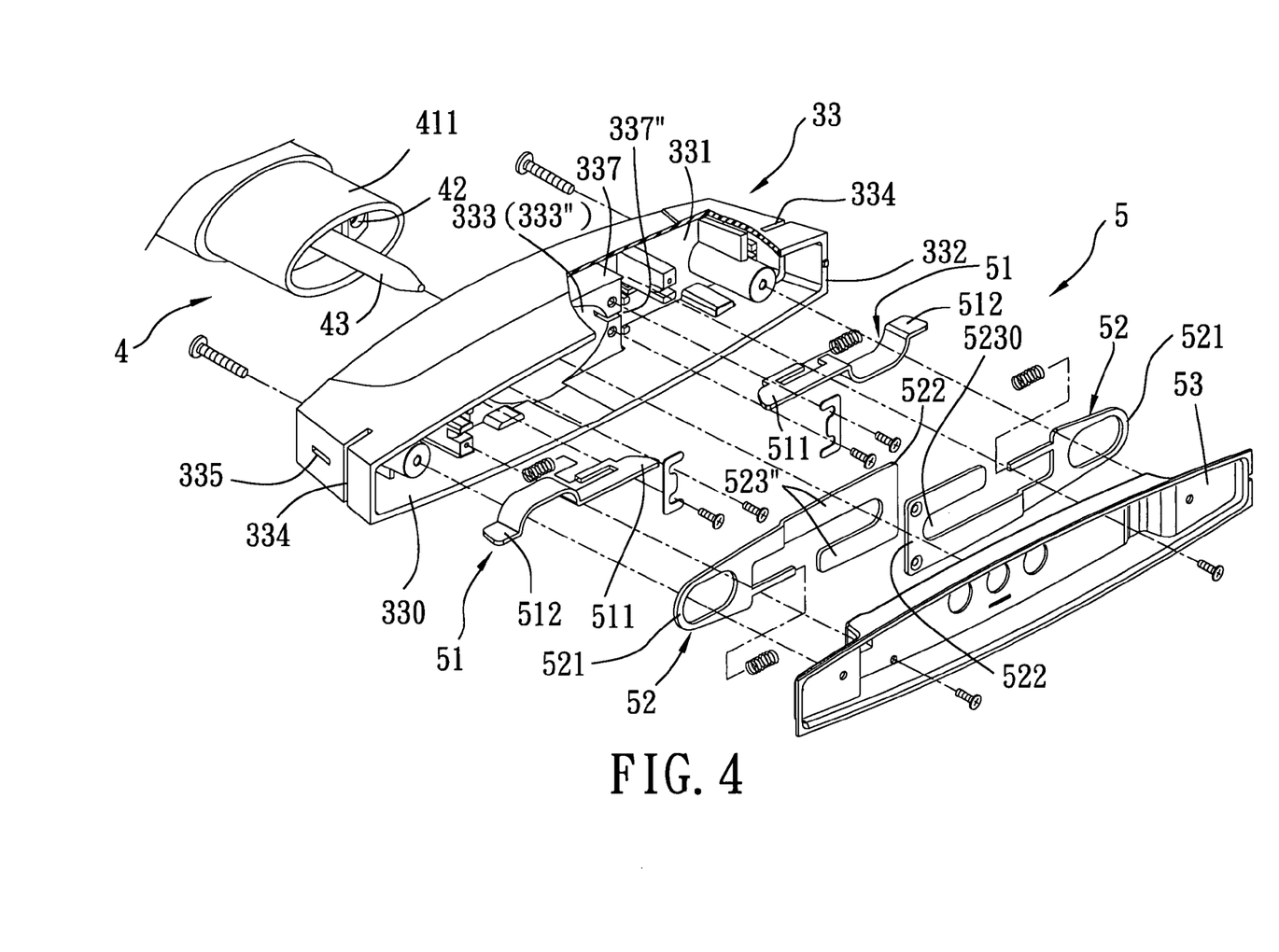
FIG. 4 is a fragmentary, exploded, partly cutaway view of the preferred embodiment.
Figure 5:
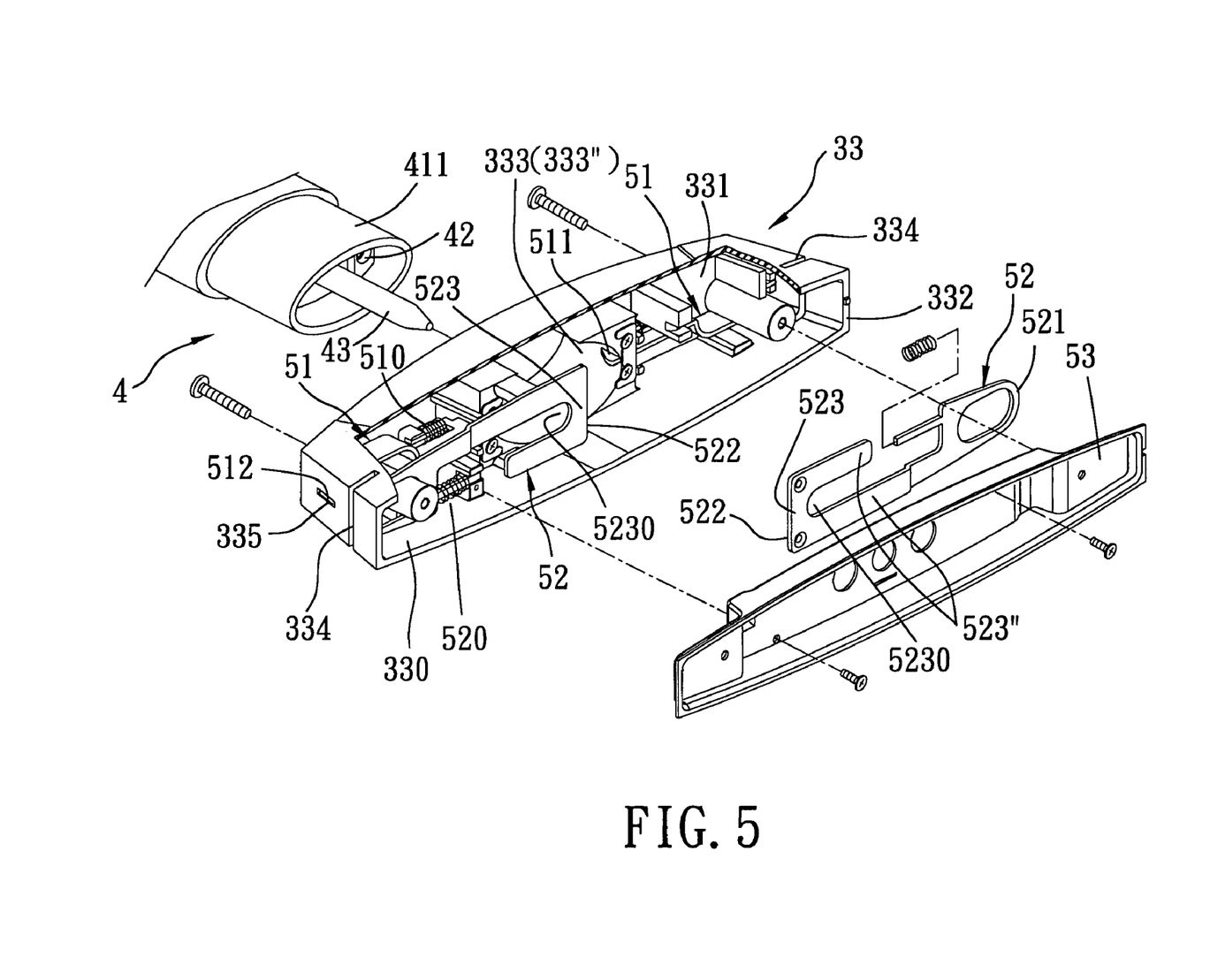
FIG. 5 is a fragmentary, exploded, partly cutaway view of the preferred embodiment, illustrating how latches and stop members of a safety device are mounted in a socket of the tray unit.

As illustrated, the base member 2 has a front end 20 formed with a socket-receiving recess 21. The socket-receiving recess 21 is defined by a recess-confining wall 21W that has two opposite vertical wall portions 211 formed with two retention grooves 23. The front end 20 of the base member 2 is further formed with two engaging parts 22 that project respectively and transversely from the vertical wall portions 211 of the recess-confining wall 21W into the recess 21.

The tray unit 3 is mounted detachably on the base member 2, and includes a cooking tray 31, a heating member 32, an oil collecting tray 35, and a socket. The heating member 32 is embedded in the cooking tray 31 for heating the same, and has two electrical contacts 321 (see FIG. 2). The cooking tray 31 has a corrugated cooking surface 311 and a flat cooking surface 312 (see FIG. 3) opposite to the corrugated cooking surface 311. The cooking tray 31 can be turned over on the base member 2 so that food can be disposed on either one of the cooking surfaces 311,312 for cooking. The oil-collecting tray 35 is disposed below the cooking tray 31 for collecting oil that drips therefrom during a cooking operation. The socket is fixed securely to a front end of the cooking tray 31, has an insulated socket casing 33 formed with a plug hole 333 that defines a plug path 333" therein, and is received in that socket-receiving recess 21 when the tray unit 3 is mounted on the base member 2.

Figure 7:
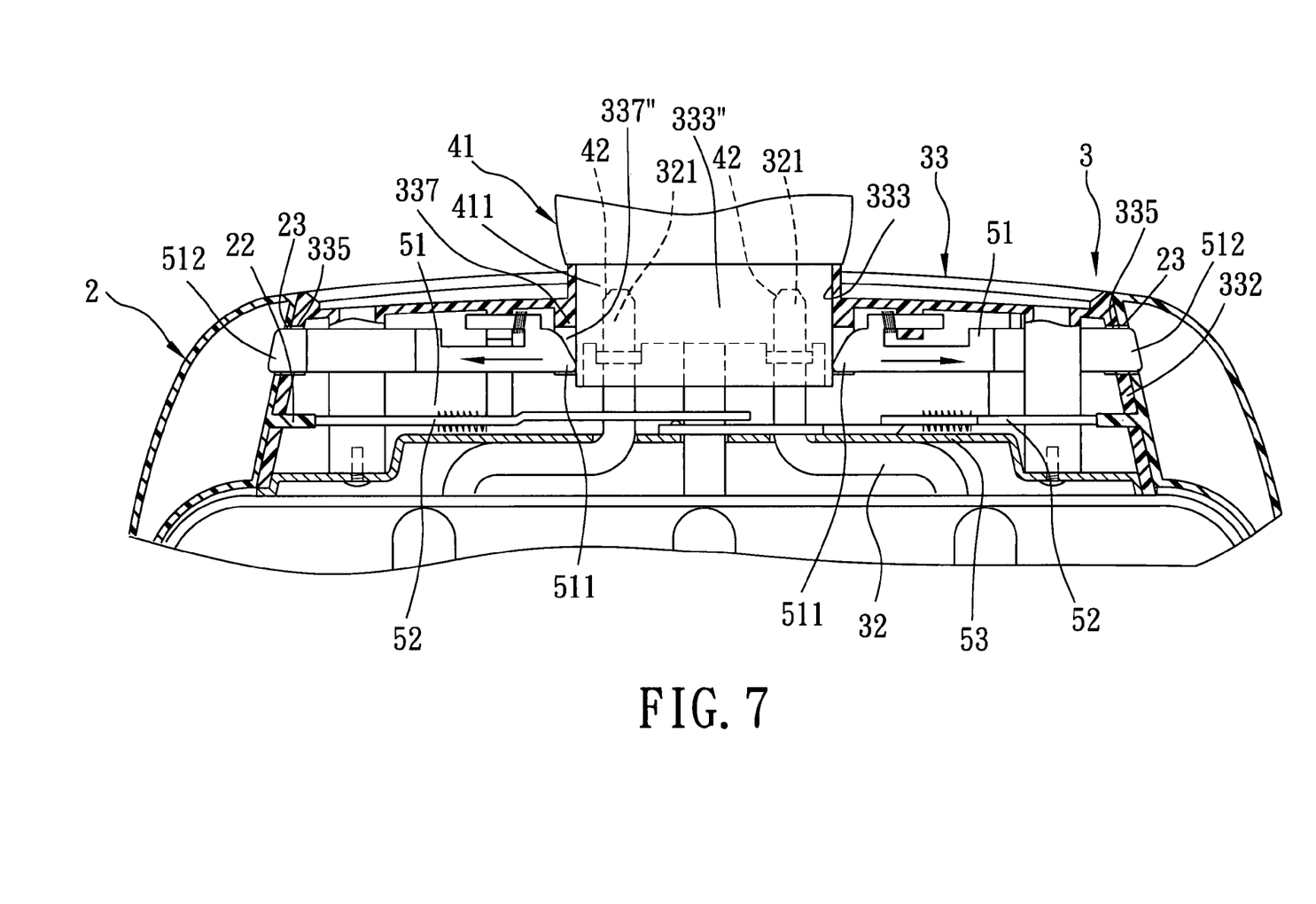

The plug 4 is connected to a power source (not shown) through a cable 41 and is insertable into the socket for establishing electrical connection between the cooking assembly of the present invention and the power source. The plug 4 includes an insulated insert seat 411 formed with two electrical terminals 42 (only one is visible in FIGS. 2, 4, and 5), a temperature sensor 43 projecting outwardly from the insert seat 411, and a temperature control 44. The temperature sensor 43 is connected to the temperature control 44 for controlling or setting the temperature of the heating member 32. When the tray unit 3 is mounted on the base member 2, the insert seat 411 of the plug 4 is insertable releasably into the plug hole 333 in the socket casing 33 along the plug path 333" for establishing an electrical connection between the electrical terminals 42 of the plug 4 and the electrical contacts 321 of the heating member 32 (see FIG. 7).

Figure 6:
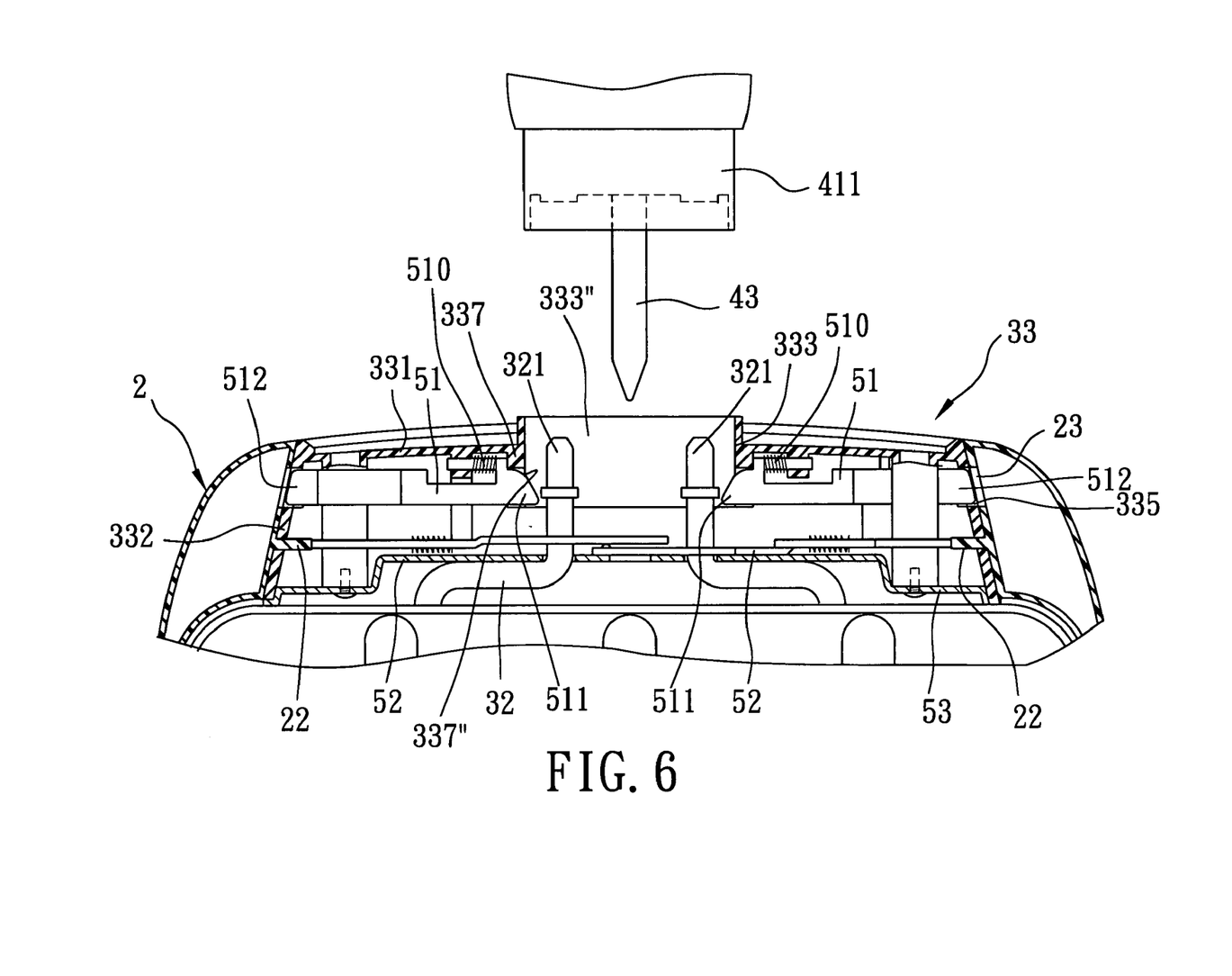
FIGS. 6 and 7 are fragmentary, exploded, sectional views of the preferred embodiment, illustrating how the latches of the safety device are moved from a first position to a second position upon insertion of a plug into the socket of the tray unit.

The safety device 5 includes two spring-biased latches 51 and two spring-biased stop members 52. Each of the latches 51 is mounted movably in the socket casing 33, has first and second engaging ends 511, 512, and is movable in a transverse direction relative to the plug path 333". When the tray unit 3 is mounted on the base member 2 and when the plug is detached from the tray unit 3' the latches 51 are disposed at a first position, in which the first engaging ends 511 of the respective latches 51 are disposed at a position within the plug path 333" (see FIG. 6), and in which the second engaging ends 512 of the respective latches 51 are disengaged from the base member 2 (see FIG. 6). When the plug 4 is inserted into the socket hole 333 in the socket casing 33 to push the first engaging ends 511 of the latches 51, the latches 51 are moved in the transverse direction from the first position to a second position, in which the first engaging ends 511 of the respective latches 51 are disposed at a position outside the plug path 333" (see FIG. 7), and in which the second engaging ends 512 of the respective latches 51 engage the base member 2, thereby preventing untimely and undesired removal of the tray unit 3 from the base member 2 when the plug 4 is inserted into the socket casing 33.

Two first urging members 510 (see FIG. 5) are mounted respectively on the latches 51, and are coupled to the socket casing 33 in such a manner as to urge the latches 51, respectively, toward the first position.

The socket casing 33 defines an inner space 330 therein, and a rear opening for access into the inner space 330, and includes a front wall 331, two opposite side walls 332, and a rear cover 53. The front wall 331 of the socket casing 33 defines a front side of the inner space 330, and is formed with an opening in spatial communication with the plug hole 333 for extension of the insert seat 411 of the plug 4 therethrough. The side walls 332 extend rearwardly and respectively from two opposite sides of the front wall 331, and are respectively formed with two opposite extension slots 335. The side walls 332 of the socket casing 33 are further formed with two apertures 334, respectively, which are disposed rearwardly of the extension slots 335, respectively. The rear cover 53 is coupled to the front end of the cooking tray 31, and is further mounted on the socket casing 33 in such a manner as to cover the rear opening in the socket casing 33. The latches 51 are mounted movably in the inner space 330 in the socket casing 33, and extend in the transverse direction. The socket casing 33 is further formed with a hollow protrusion 337 that projects rearwardly from the front wall 331 thereof into the inner space 330, that defines the plug hole 333, and that is formed with two opposite holes 337" in spatial communication with the plug hole 333. When the latches 51 are disposed at the first position, the first engaging ends 511 of the latches 51 extend respectively through the holes 337" in the protrusion 337 and into the plug path 333" (see FIG. 6), and the second engaging ends 512 of the latches 51 are received in the extension slots 335 in the socket casing 33. When the latches 51 are disposed at the second position, the second engaging ends 512 of the latches 51 extend respectively through the extension slots 335 and into the retention grooves 23 in the vertical wall portions 211 of the recess 21 in the base member 2 (see FIG. 7) to thereby prevent removal of the tray unit 3 from the base member 2, and the first engaging ends 511 of the latches 51 are retracted from the plug path 333" and are thus received within the holes 337" in the protrusion 337 (see FIG. 7).

Figure 8:
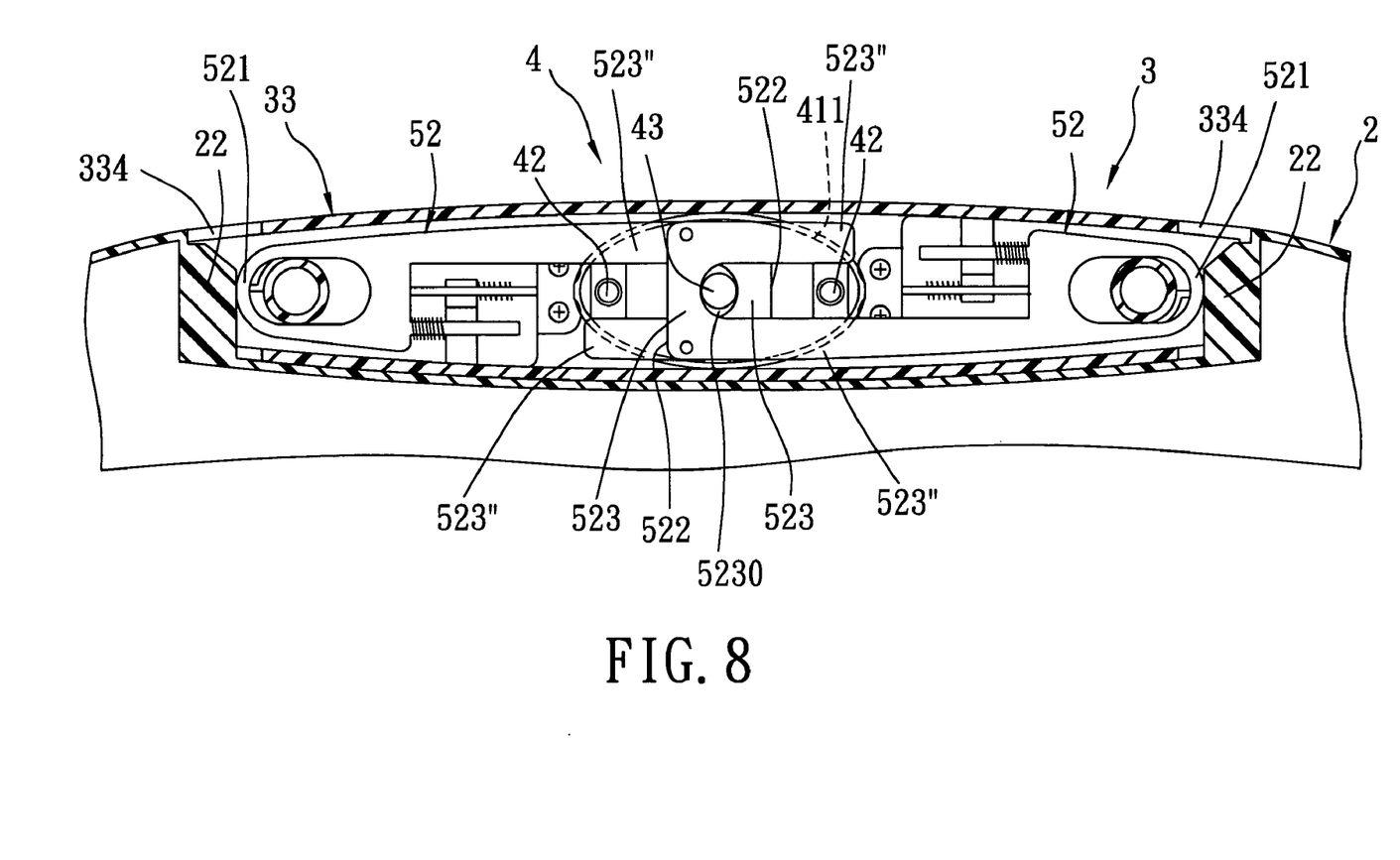
FIG. 8 is a fragmentary sectional view of the preferred embodiment, illustrating how the plug is inserted through the stop members and the tray unit when the tray unit is mounted on a base member.
Figure 9:
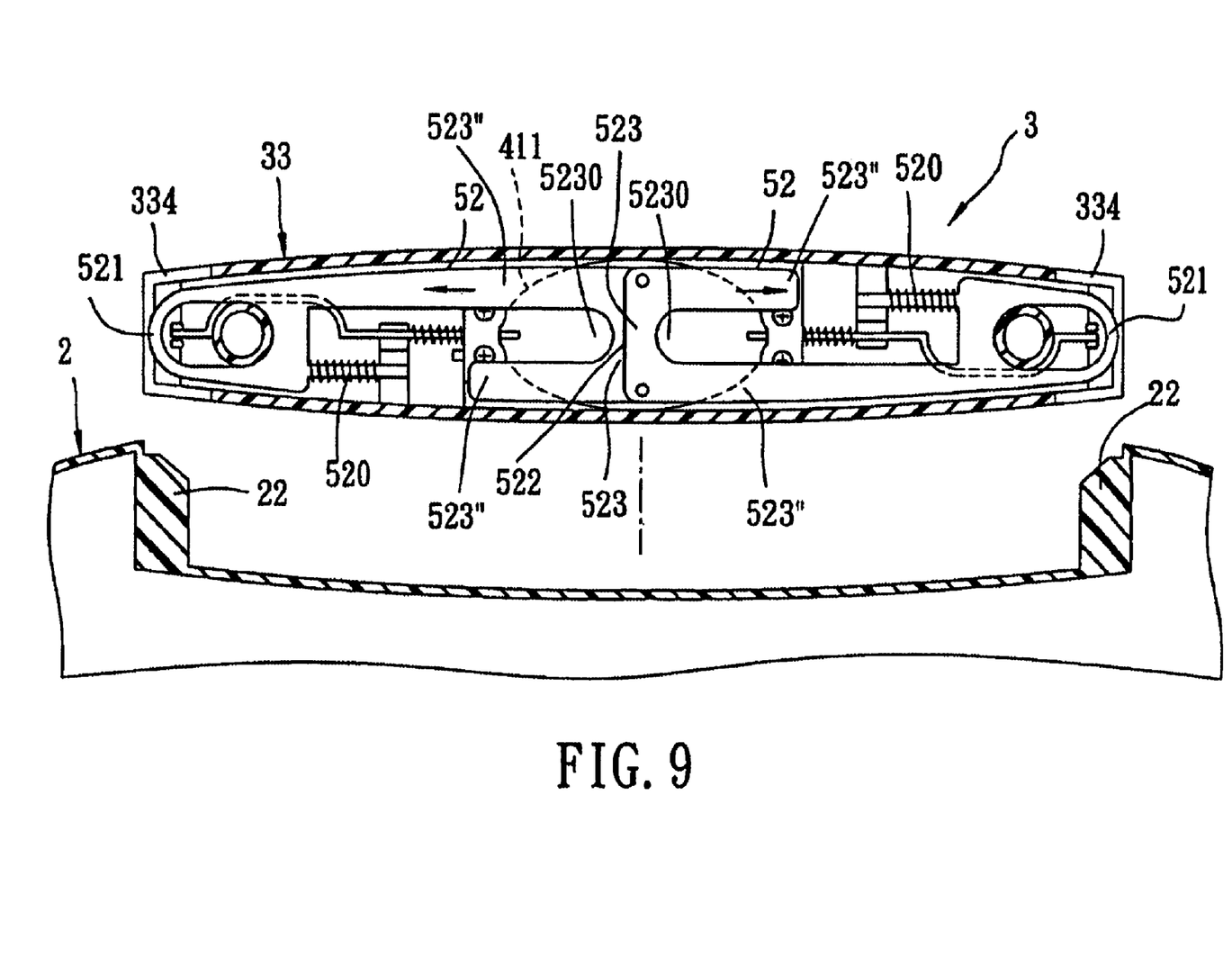
FIG. 9 is a fragmentary sectional view of the preferred embodiment, illustrating how the plug is blocked by the stop members when the tray unit is removed from the base member.

In this preferred embodiment, the stop members 52 are mounted movably in the socket casing 33, and are disposed rearwardly of the lathes 51, respectively. Each of the stop members 52 has opposite first and second ends 522,521. The temperature sensor 43 of the plug 4 moves along a sensor passage during insertion of the plug 4 into the plug hole 333 in the socket casing 33 to come close to the tray unit 3. When the tray unit 3 is detached from the base member 2, as shown in FIG. 9, the stop members 52 are disposed at a stopping position, in which the first ends 522 of the stop members 52 overlap each other and are disposed at a position within the sensor passage, thereby preventing extension of the temperature sensor 43 through the sensor passage to come close to the tray unit 3. Upon mounting of the tray unit 3 on the base member 2, as shown in FIG. 8, the engaging parts 22 extend respectively through the apertures 334 in the side walls 332 of the socket casing 33 and push the second ends 521 of the stop members 52 such that the stop members 52 move in the transverse direction from the stopping position to an open position, in which the first ends 522 of the stop members 52 are disposed at a position outside the sensor passage, thereby permitting extension of the temperature sensor 43 of the plug 4 through the sensor passage to come close to the cooking tray 31. Two second urging members 520 are mounted respectively on the stop members 52, and are coupled to the socket casing 33 in such a manner as to urge, respectively, the stop members 52 to the stopping position (see FIGS. 5 and 9).

Each of the stop members 52 preferably has a U-shaped end segment that includes a bight portion 523 (see FIGS. 4 and 5) defining the first end 522 of a respective one of the stop members 52, and two opposite arm portions 523" extending from two opposite sides of the bight portion 523 and defining a gap 5230 therebetween. The gaps 5230 between the arm portions 523" of the U-shaped end segments of the stop members 52 are disposed outside of the sensor passage when the stop members 52 are disposed at the stopping position, and are disposed within the sensor passage to permit extension of the temperature sensor 43 therethrough when the stop members are disposed at the open position.

With the inclusion of the latches 51 and the stop members 52 of the safety device 5 in the cooking assembly of the present invention, undesired removal of the tray unit 3 from the base member 2 can be prevented when the plug 4 is inserted into the plug hole 333 in the socket casing 33, and insertion of the plug into the plug hole 333 in the socket casing 33 is prevented when the tray unit 3 is removed from the base member 2, thereby eliminating the aforesaid drawback associated with the prior art.

With this invention thus explained, it is apparent that numerous modifications and variations can be made without departing from the scope and spirit of this invention. It is therefore intended that this invention be limited only as indicated in the appended claims.

We claim:

1. A cooking assembly comprising:
a base member;
a tray unit mounted detachably on said base member, and including a cooking tray and a socket that is fixed securely to said cooking tray and that has a socket casing formed with a plug hole that defines a plug path therein;

a plug insertable releasably into said plug hole in said socket casing along said plug path for establishing electrical connection with said tray unit; and a safety device including at least one spring-biased latch mounted movably in said socket casing, having first and second engaging ends, and movable in a transverse direction relative to said plug path between a first position, in which said first engaging end of said latch is disposed at a position within said plug path, thereby permitting contact between said first engaging end of said latch and said plug when said plug is inserted into said plug hole in said socket casing, and in which said second engaging end of said latch is disengaged from said base member, and a second position, in which said first engaging end of said latch is disposed at a position outside said plug path, and in which said second engaging end of said latch engages said base member.

2. The cooking assembly as defined in claim 1, wherein said safety device includes two of said latches, said cooking assembly further comprising two first urging members for urging respectively said latches toward said first position.

3. The cooking assembly as defined in claim 2, wherein said cooking tray has a front end, said socket casing being fixed to said front end of said cooking tray, defining an inner space therein, and including a front wall that defines a front side of said inner space and that is formed with an opening for extension of said plug therethrough, said opening being in spatial communication with said plug path.

4. The cooking assembly as defined in claim 3, wherein said socket casing further includes two opposite side walls extending rearwardly and respectively from two opposite sides of said front wall and formed with two opposite extension slots, respectively, said latches being mounted movably in said inner space and extending in said transverse direction, said second engaging ends of said latches being received respectively in said extension slots in said side walls when said latches are disposed at said first position, and extending respectively through said extension slots to engage said base member when said latches are disposed at said second position.

5. The cooking assembly as defined in claim 3, wherein said socket casing is formed with a hollow protrusion that projects rearwardly from said front wall into said inner space and defining said plug hole, and that is formed with two opposite holes in spatial communication with said plug hole, said first engaging ends of said latches extending through said holes in said protrusion and into said plug path when said latches are disposed at said first position, and being retracted in said holes when said latches are disposed at said second position.

6. The cooking assembly as defined in claim 3, wherein said socket casing defines a rear opening opposite to said front wall, and includes a rear cover covering said rear opening.

7. The cooking assembly as defined in claim 1, wherein said base member has a front end formed with a socket-receiving recess to receive said socket casing when said tray unit is mounted on said base member, said socket-receiving recess being defined by a recess-confining wall that has two opposite vertical wall portions formed with two retention grooves, respectively, said second engaging ends of said latches respectively extending into and engaging said retention grooves when said latches are disposed at said second position, thereby preventing undesired removal of said tray unit from said base member.

8. The cooking assembly as defined in claim 7, wherein said front end of said base member is further formed with at least one engaging part that projects transversely from said recess-confining wall into said recess, said engaging part extending into said socket casing when said tray unit is mounted on said base member, said plug including a temperature sensor projecting outwardly therefrom, said temperature sensor being moved along a sensor passage during insertion of said plug into said plug hole in said socket casing in order to come close to said cooking tray when said tray unit is mounted on said base member, said safety device further including at least one spring-biased stop member that is mounted movably in said socket casing, that is disposed rearwardly of said lathes and that has opposite first and second ends, said stop member being disposed at a stopping position, in which said first end of said stop member is disposed at a position within said sensor passage when said tray unit is detached from said base member, thereby preventing extension of said temperature sensor through said sensor passage toward said cooking tray, said second end of said stop member contacting and being pushed by said engaging part of said base member upon mounting of said tray unit on said base member in such a manner that said stop member moves in said transverse direction from said stopping position to an open position, in which said first end of said stop member is disposed at a position outside said sensor passage, thereby permitting extension of said temperature sensor through said sensor passage toward said cooking tray.

9. The cooking assembly as defined in claim 8, wherein each of said stop members has a U-shaped end segment that includes a bight portion defining said first end of a respective one of said stop members, and two opposite arm portions extending from two opposite sides of said bight portion and defining a gap therebetween, said gaps between said arm portions of said U-shaped end segments of said stop members being disposed outside of said sensor passage when said stop members are disposed at said stopping position, said gaps being disposed within said sensor passage so as to permit extension of said temperature sensor therethrough when said stop members are disposed at said open position.

10. The cooking assembly as defined in claim 8, wherein said safety device includes two of said stop members, said cooking assembly further comprising two second urging members for urging respectively said stop members to said stopping position.

11. The cooking assembly as defined in claim 10, wherein said front end of said base member is formed with two of said engaging parts, said socket casing having two opposite side walls formed with two apertures for extension of said engaging parts of said base member therethrough so as to push said second ends of said stop members and so as to move said stop members against urging action of said second urging members from said stopping position to said open position when said tray unit is mounted on said base member.

12. A cooking assembly comprising:
a base member formed with at least an engaging part;
a tray unit mounted detachably on said base member, and including a cooking tray and a socket that is fixed securely to said cooking tray and that has a socket casing formed with a plug hole that defines a plug path therein, said engaging part of said base member extending into said socket casing when said tray unit is mounted on said base member;
a plug insertable releasably into said plug hole in said socket casing, and including a temperature sensor projecting outwardly therefrom, said temperature sensor being moved along a sensor passage during insertion of said plug into said plug hole in said socket casing in order to come close said cooking tray; and a safety device including at least one spring-biased stop member mounted movably in said socket casing, and having opposite first and second ends, said stop member being disposed at a stopping position, in which said first end of said stop member is disposed at a position within said sensor passage when said tray unit is detached from said base member, thereby preventing extension of said temperature sensor through said sensor passage to come close to said cooking tray, said second end of said stop member contacting and being pushed by said engaging part upon mounting of said tray unit on said base member such that said stop member moves in a transverse direction relative to said sensor passage from said stopping position to an open position, in which said first end of said stop member is disposed at a position outside said sensor passage, thereby permitting extension of said temperature sensor through said sensor passage to come close to said cooking tray.

13. The cooking assembly as defined in claim 12, further comprising two urging members for urging respectively said stop members from said open position to said stopping position when said tray unit is detached from said base member.

14. The cooking assembly as defined in claim 12, wherein each of said stop members has a U-shaped end segment that includes a bight portion defining said first end of a respective one of said stop members, and two opposite arm portions extending from two opposite sides of said bight portion and defining a gap therebetween, said gaps between said arm portions of said U-shaped end segments of said stop members being disposed outside of said sensor passage when said stop members are disposed at said stopping position, said gaps being disposed within said sensor passage so as to permit extension of said temperature sensor therethrough when said stop members are disposed at said open position.

15. The cooking assembly as defined in claim 12, wherein said base member has a front end formed with two of said engaging parts, said cooking tray having a front end, said socket casing being fixed to said front end of said cooking tray, defining an inner space therein, and including a front wall that defines a front side of said inner space and that is formed with an opening for extension of said plug therethrough, said opening being in spatial communication with said plug hole, said safety device including two of said stop members, which are movably received in said inner space, said socket casing further including two opposite side walls extending rearwardly and respectively from two opposite sides of said front wall and formed with two apertures, respectively, for extension of said engaging parts of said base member therethrough so as to push said second ends of said stop members and so as to move said stop members from said stopping position to said open position when said tray unit is mounted on said base member.

16. The cooking assembly as defined in claim 15, wherein said socket casing defines a rear opening opposite to said front wall, and includes a rear cover covering said rear opening in said socket casing.

* * * * *